United States Patent
Schliwa-Bertling et al.

(10) Patent No.: US 8,411,561 B2
(45) Date of Patent: Apr. 2, 2013

(54) METHOD AND NODES FOR CONGESTION NOTIFICATION

(75) Inventors: Paul Schliwa-Bertling, Ljungsbro (SE); Jari Vikberg, Järna (SE); Reiner Ludwig, Hurtgenwald (DE); Janne Peisa, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 211 days.

(21) Appl. No.: 12/812,475

(22) PCT Filed: Jan. 13, 2009

(86) PCT No.: PCT/EP2009/050302
§ 371 (c)(1),
(2), (4) Date: Sep. 28, 2010

(87) PCT Pub. No.: WO2009/090160
PCT Pub. Date: Jul. 23, 2009

(65) Prior Publication Data
US 2011/0032819 A1      Feb. 10, 2011

Related U.S. Application Data

(60) Provisional application No. 61/020,799, filed on Jan. 14, 2008.

(51) Int. Cl.
*G01R 31/08* (2006.01)
(52) U.S. Cl. .................. 370/229; 370/412; 370/235
(58) Field of Classification Search .................. 370/223, 370/229
See application file for complete search history.

(56) References Cited

U.S. PATENT DOCUMENTS

| | | | |
|---|---|---|---|
| 6,625,118 B1 * | 9/2003 | Hadi Salim et al. | 370/229 |
| 7,447,181 B1 * | 11/2008 | Forssell | 370/336 |
| 2006/0104298 A1 | 5/2006 | McAlpine et al. | |
| 2009/0268614 A1 * | 10/2009 | Tay et al. | 370/236 |
| 2010/0195521 A1 * | 8/2010 | Wanstedt et al. | 370/252 |
| 2010/0238832 A1 * | 9/2010 | Gunnarsson et al. | 370/252 |

FOREIGN PATENT DOCUMENTS

EP    1317151 A1    6/2003

OTHER PUBLICATIONS

Ramakrishnan, K. et al. "The Addition of Explicit Congestion Notification (ECN) to IP." IETF Network Working Group Request for Comments: 3168; Updates: 2474, 2401, 793; Obsoletes: 2481; Category: Standards Track; Sep. 2001.

Yi, S. et al. "Proxy-RED: An AQM Scheme for Wireless Local Area Networks." Proceedings of the 13th International Conference on Computer Communications and Networks (ICCCN 2004), Chicago, IL, US, Oct. 11-13, 2004, pp. 460-465.

* cited by examiner

*Primary Examiner* — Hassan Kizou
*Assistant Examiner* — Hashim Bhatti
(74) *Attorney, Agent, or Firm* — Coats & Bennett, P.L.L.C.

(57) ABSTRACT

A method of performing congestion notification for a data transmission (10) from a sender (14) to a receiver (11) is described. Furthermore, nodes for such a transmission as well as methods of controlling such nodes are described. The data transmission involves a first node (12) and a second node (13) between said sender and receiver. The data packets pass from said second node to said first node towards said receiver. The method comprises: —sending (S82) a message (15) from said first node to said second node, said message relating to a decision on whether to notify said receiver of a congestion condition in said data transmission, —sending (S83) an explicit congestion notification (16) from said second node to said receiver if it is decided to notify said receiver of said congestion condition.

18 Claims, 13 Drawing Sheets

METHOD AND NODES FOR CONGESTION NOTIFICATION

TECHNICAL FIELD

The present application relates to a method for performing congestion notification in a data transmission of data packets over a communication network, as well as to communication network nodes adapted for participating in such a data transmission.

BACKGROUND

In the field of packet based communication, it is often desirable to inform the sender of packets in a communication of a congestion condition along the communication path, such that the sender can appropriately adjust its flow control. An indirect (implicit) way of doing this is to drop packets and rely on the communication end points noticing and correctly interpreting this loss of packets. A direct (explicit) way of doing this is to send an explicit congestion indication to the communication end points, i.e. explicit information that informs of the presence or threat of congestion.

For example, packet marking is typically used by Internet routers to alert applications that congestion has occurred somewhere along the transmission path. The application or transport layer can then reduce the transmission rate to reduce the congestion. The packet marking for IP (Internet Protocol) is generally called Explicit Congestion Notification (ECN) and is defined in Request for Comments (RFC) 3168. Such packet marking is generally a complementary congestion control method to more robust packet dropping.

For ECN capable IP flows, the IP header indicates per packet the support for ECN. The actual packet marking is done in ECN capable IP routers by modifying the ECN field of the IP header to indicate congestion.

For nodes that are not directly accessing the IP header (i.e. for non-routers), this presents a problem, as it may not always be possible to observe or modify the encapsulated IP packet header. This situation occurs for example with MPLS (Multiprotocol Label Switching) or PPTP (Point-to-point tunneling protocol), and in general whenever ciphering or integrity protection is used and/or the modification of the IP header is impossible.

If nothing is done an implicit congestion notification will be provided by experienced packet drops, i.e. the receiver experiences packet losses and can take this as a sign of congestion. However, this is not acceptable for many applications (e.g., a video service would be stalled). In other words, it is often desirable to provide a form of explicit congestion notification, e.g. ECN as known in connection with IP.

One example for how to notify an application about increased risks for congestion in the network, before congestion happens, is to use ECN on the IP layer. The application in the receiver can use the received ECN indication as a trigger to inform the sender application to lower the packet rate and by that avoid packet losses. This can be achieved by using application layer signaling (e.g. the Real-Time Control Protocol (RTCP)). These principles are shown in FIG. 2 in relation to a mobile network consisting of a Radio Access Network (RAN) and Packet Switched Core Network (PS CN) parts. More specifically, an application 24 running on User Equipment (UE) 21, which also acts as a Mobile Station (MS) of a mobile communication system comprising a node 22 of a Radio Access Network and a node 23 of a Packet Switched Core Network, has established an end-to-end IP communication with another application 25 that runs on another terminal (not shown), such as e.g. another UE communicating with the mobile communication system. The control of the Access Stratum (AS) communication on the section (e.g. link) between the MS and the RAN can not access the IP packets, in contrast to the control of the Non-Access Stratum (NAS) on the section between the MS and the PS CN.

In current second generation (2G) and third generation (3G) systems (including the Long Term Evolution (LTE)) the link layer does not support packet marking at intermediate nodes. The marking is only possible at the UE and Gateway General Packet Radio Service Support Node (GGSN) (and System Architecture Evolution Gateway (SAE-GW)) nodes. For example, entity 22 of the RAN in FIG. 2 may not be able to ECN mark IP packets for lack of being able to access the IP header.

The problems related to packet marking are further shown in FIG. 3 in relation to the Packet Switched (PS) domain in GERAN (GSM EDGE Radio Access Network, where GSM stands for Global System for Mobile communications and EDGE for Enhanced Data Rates for GSM Evolution). Similar to the generic case of FIG. 2, an application 35 communicates with another application (not shown) via a protocol stacked network comprising an MS 31, a Base Station Subsystem (BSS) 32, a Serving GPRS Support Node (SGSN) 33 and a Gateway GPRS Support Node (GGSN) 34. The basic structure is known, such that a further explanation is not necessary. The involved abbreviations are as follows, as far as they have not yet been explained: SNDCP=Sub-Network Dependent Convergence Protocol; LLC=Logical Link Control; RLC=Radio Link Control; MAC=Medium Access Control; RF=Radio Frequency; BSSGP=Base Station Subsystem GPRS Protocol; L1=Layer 1; GTP=GPRS Tunneling Protocol; GTP-U=GPRS Tunneling Protocol for User Plane; UDP=User Datagram Protocol; L2=Layer 2; Um, Gb, Gn and Gi are known interfaces.

The Base Station Subsystem (BSS) 32 comprises a Base Station Controller (BSC) and a number of Base Transceiver Stations (BTS) and would be a good place to perform packet marking, for example based on the radio conditions and the different packet queues in the downlink direction. The main problem in this case is that the LLC-protocol (Logical Link Control protocol) between the MS 31 and the SGSN 33 is normally operating in ciphered mode. This means that the BSS 32 has no way to perform packet marking in the IP packet header, as the IP packet is sent ciphered through the BSS 32.

Another example of the same problem is shown in FIG. 4, where the PS domain user plane is shown for a Generic Access Network (GAN). For simplicity, neither the application layer nor the GGSN is shown. The communication generically shown in FIG. 2 is embodied by an MS 41, a node 42 of a generic IP network, a GAN controller (GANC) 43 and an SGSN 44. Similar to the BSS in the case of FIG. 3, the GANC 43 is not able to perform packet marking as the LLC-layer between the MS 41 and the SGSN 44 is normally functioning in ciphered mode. The basic structure is known, such that a further explanation is not necessary. The involved abbreviations are as follows, as far as they have not yet been explained: GA-PSR=Generic Access Packet Switched Resources; IPSec=Internet Protocol Security; ESP=Encapsulating Security Payload.

The existing link layer mechanisms in GERAN, GAN, WCDMA (Wideband Code Division Multiple Access) and LTE do not support packet marking in those nodes which handle and/or control the link layer on the air interface to the MS, e.g. BSS/BSC, GANC, RNC or eNodeB (E-UTRAN NodeB where E-UTRAN stands for Evolved UTRAN and UTRAN stands for Universal Terrestrial Radio Access Network). In the GERAN and GAN cases, it is not even possible for these nodes to access the IP packet header for packet marking.

SUMMARY

The object of the present application is to provide an improved mechanism for performing congestion notification.

This object is solved by the subject-matter of the independent claims. Advantageous embodiments are described in the dependent claims.

According to the present invention, a method of performing congestion notification for a data transmission from a sender to a receiver is suggested, said data transmission involving a first node and a second node between said sender and receiver, said data packets passing from said second node to said first node towards said receiver, where said method comprises:

sending a message from said first node to said second node, said message relating to a decision on whether to notify said receiver of a congestion condition in said data transmission, sending an explicit congestion notification from said second node to said receiver if it is decided to notify said receiver of said congestion condition.

In other words, it is proposed to send a message against the direction of the packet flow, i.e. towards a node lying upstream, and then letting the upstream node perform an explicit congestion notification if it is decided to notify the receiver of the data transmission. It is noted that the term explicit congestion notification or ECN is used generically to describe any form of explicit signaling towards the receiver that conveys information regarding congestion (either already happening or threatening). The specific ECN concept described in RFC 3168 is thus one example of such a generic explicit congestion notification. It is furthermore noted that the term node relates to a single unit or a group of units that provide one or more functionalities in a network.

The advantage of the proposed concept is that the performing of congestion notification becomes more flexible and easy to implement, as e.g. even a node that for any given reason is unable to directly send an explicit congestion notification to the receiver (for example a node that can not access a certain protocol header in which a field is defined for markings that indicate congestion) can be involved in the process of congestion monitoring and congestion notification, namely by sending appropriate messages upstream to another node that in turn is capable of sending the explicit congestion notification to the receiver (for example a node that can access a certain protocol header in which a field is defined for markings that indicate congestion). The decision on whether to notify can be made by the first node or the second node. In the former case, the message to the second node may comprise the result of the decision, i.e. a congestion indication that triggers the second node to send an explicit congestion notification, and in the latter case the message may contain information for making the decision (e.g. results of monitoring queue lengths, link delays, etc.), and the second node then proceeds to make the decision based on that information.

BRIEF DESCRIPTION OF FIGURES

Embodiments of the invention will now be described by making reference to non-limiting embodiments, where reference will made to figures in which.

DETAILED DESCRIPTION

Figure 1:
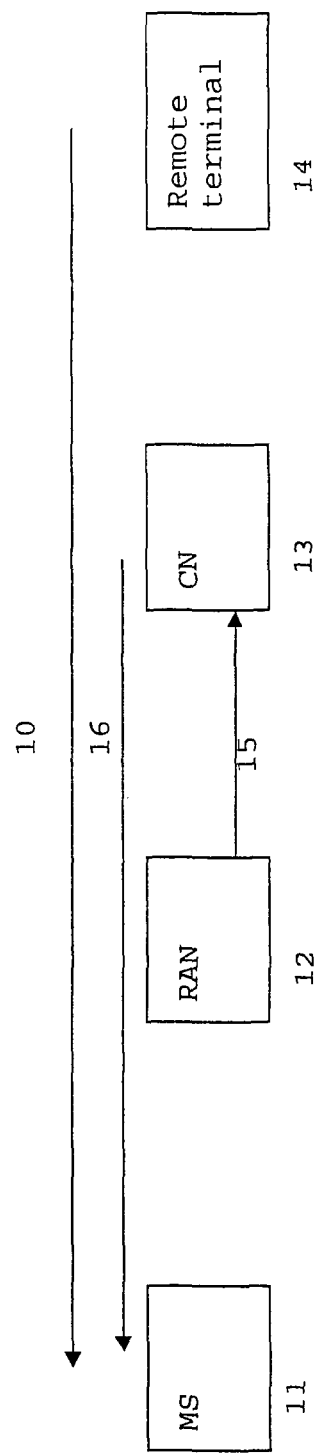
FIG. 1 shows a schematic representation of nodes of a communication network involved in an embodiment of the present invention.
Figure 2:
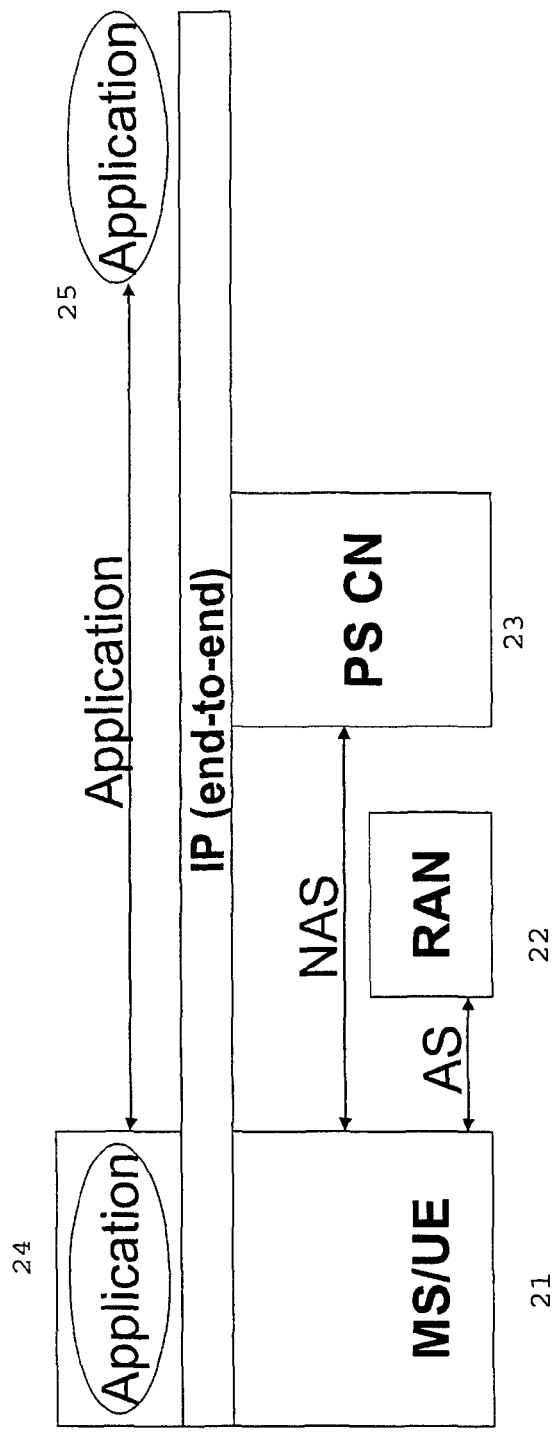
FIG. 2 shows a schematic representation of a communication between two application peers.

A basic embodiment of the invention will now be described with reference to FIG. 1. A data transmission 10 between a sender 14 and a receiver 11 is taking place, which involves the sending of data packets from sender 14 to receiver 11, where the example assumes that both are communication system terminals, e.g. telephone terminals of two different telephone systems or of the same system. Furthermore, the example assumes that receiver 11 is a mobile terminal or mobile station MS of a mobile communications system that furthermore comprises an access network node such as a radio access network (RAN) node 12 and a core network (CN) node 13. It is noted that the transmission 10 may involve further nodes and elements, as is well known, but which are not shown for simplicity.

Thus the data transmission 10 involves node 12 as a first node and node 13 as a second node between the sender 14 and receiver 11, the data packets passing from the second node 13 to the first node 12 towards the receiver 11. A method embodiment of the invention then comprises:

sending a message 15 from the first node 12 to the second node 13, the message relating to a decision on whether to notify the receiver 11 of a congestion condition in the data transmission 10, and sending an explicit congestion notification 16 from the second node 13 to the receiver 11 if it is decided to notify the receiver 11 of the congestion condition. Thus the second node is arranged to be able to send such explicit congestion notifications towards the receiver, who in turn is able to send appropriate feedback to the sender, such that the sender can adjust its flow control.

The decision on whether to notify the receiver 11 of a congestion condition can be made in the first node 12 or the second node 13, as will be explained in more detail in connection with the embodiments of FIGS. 8 to 11. The decision itself can be performed in any suitable or desirable way, e.g. by evaluating the state of resources that can potentially become congested, such as link conditions (especially conditions on a radio link) and queue states. Measurement results relating to the state of such resources can be compared with threshold values, and if the comparison results in the judgment that a congestion condition is present or threatens to occur, then it can be decided to notify the receiver 11, who can then appropriately signal this to the sender (e.g. via feedback messages relating to the flow control of packets in transmission 10), such that the sender can adjust the flow of packets, for example reduce the sending rate.

The message 15 from the first node to the second node can be sent in any suitable or desirable way, for example in dedicated control messages, or as a part of feedback messages being sent from receiver 11 to sender 14. The explicit congestion notification 16 can also be sent in any suitable or desirable way. For example, this can be done through dedicated signaling separate from the flow of packets in transmission 10. However, preferably the explicit congestion notification is sent within the packets of the transmission, e.g. by marking an appropriate section of a header of said packets.

Figure 8:
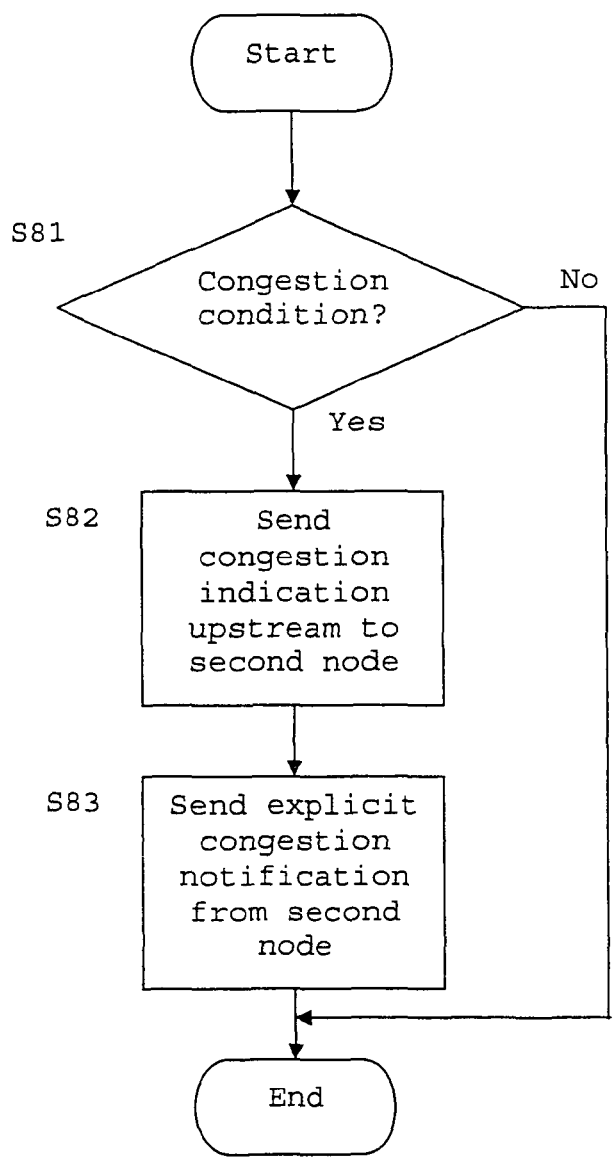
FIG. 8 shows a flow chart of a method embodiment of the present invention.

FIG. 8 shows a flow chart of a method in which the first node 12 makes the decision and the message 15 comprises a congestion indication. More specifically, in step S81 the first node 12 determines whether a congestion condition is present or threatening, and if this is the case, proceeds to step S82, in which a congestion indication is sent in message 15 upstream to second node 13. The second node 13 receives the message and then sends the explicit congestion notification 16 to receiver 11, see step S83.

Figure 9:
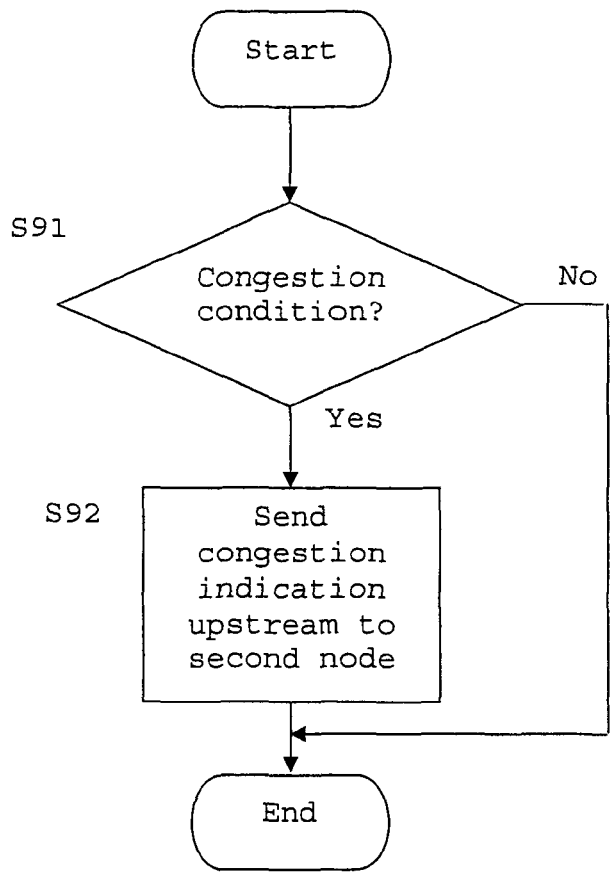
FIG. 9 shows a flow chart of a method embodiment of the present invention for controlling the first node.

FIG. 9 shows a flow chart of a corresponding method of controlling a first node 12 of a transmission network for handling a data transmission 10 from a sender 14 to a receiver 11, the data transmission 10 involving said first 12 node and a further node 13 between said sender 14 and receiver 11, said data packets passing from said further node 13 to said node 12 towards said receiver 11, where the method comprises:
making a decision S91 on whether to notify the receiver 11 of a congestion condition in said data transmission 10 and, if it is decided to notify said receiver 11, sending a control message 15 comprising a congestion indication to said further node 13, see S92.

Figure 10:
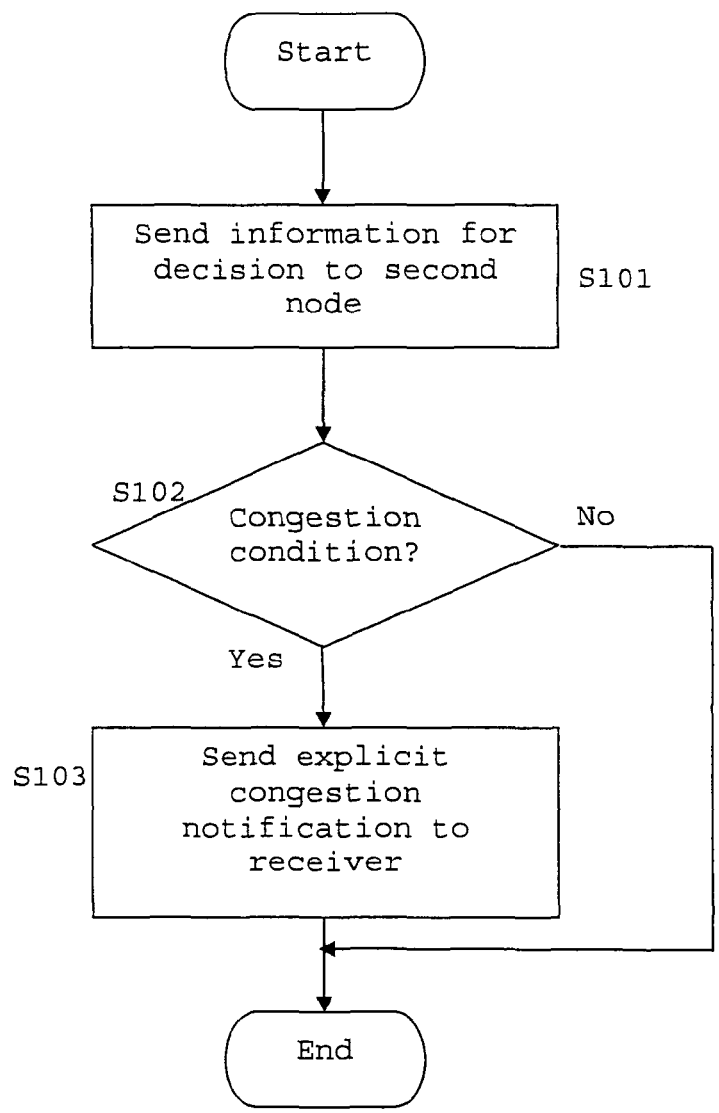
FIG. 10 shows a flow chart of a further method embodiment of the present invention.

An alternative to FIG. 8 is shown in FIG. 10. In this example, message 15 comprises information for making said decision and the second node 13 makes said decision. More specifically, first node 12 sends information for the decision to the second node 13 in step S101. This information can e.g. be measurement results relating to the previously mentioned state of resources that can potentially become congested. This message 15 is then received by second node 13, which then makes a decision on whether or not a congestion condition is present, e.g. compares the state information with corresponding thresholds, see step S102. If the result is that a congestion condition is present or threatening, then an explicit congestion notification 16 is sent to the receiver 11, see S103.

Figure 11:
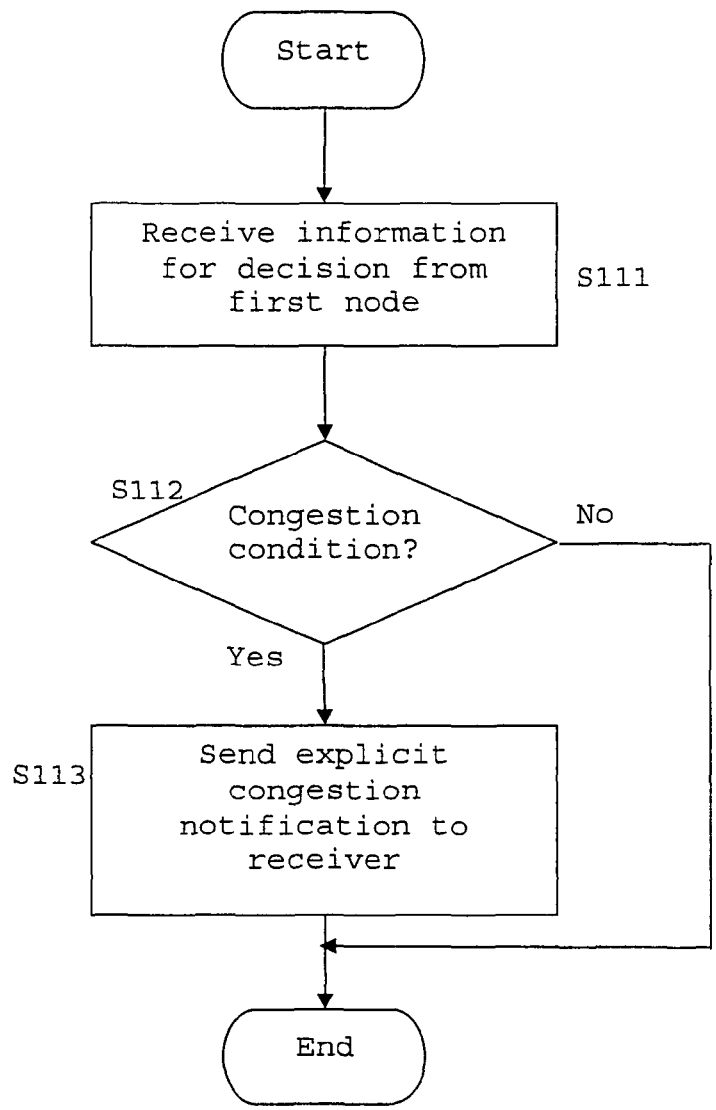
FIG. 11 shows a flow chart of a method embodiment of the present invention for controlling the second node.

FIG. 11 shows a flow chart of a corresponding method of controlling a second node 13 of a transmission network for handling a data transmission 10 from a sender 14 to a receiver 11, said data transmission 10 involving said second node 13 and a further node 12 between said sender 14 and receiver 11, said data packets passing from said node 13 to said further node 12 towards said receiver 14, where said method comprises:
receiving a message, S111, from said further node relating to a decision on whether to notify said receiver of a congestion condition in said data transmission, and
sending, S113, an explicit congestion notification to said receiver if it is decided (see S112) to notify said receiver of said congestion condition.

The above described control methods may be implemented in the form of a computer program product comprising computer code parts arranged for performing the method steps when loaded into and executed on a programmable node of a communication network.

Figure 12:
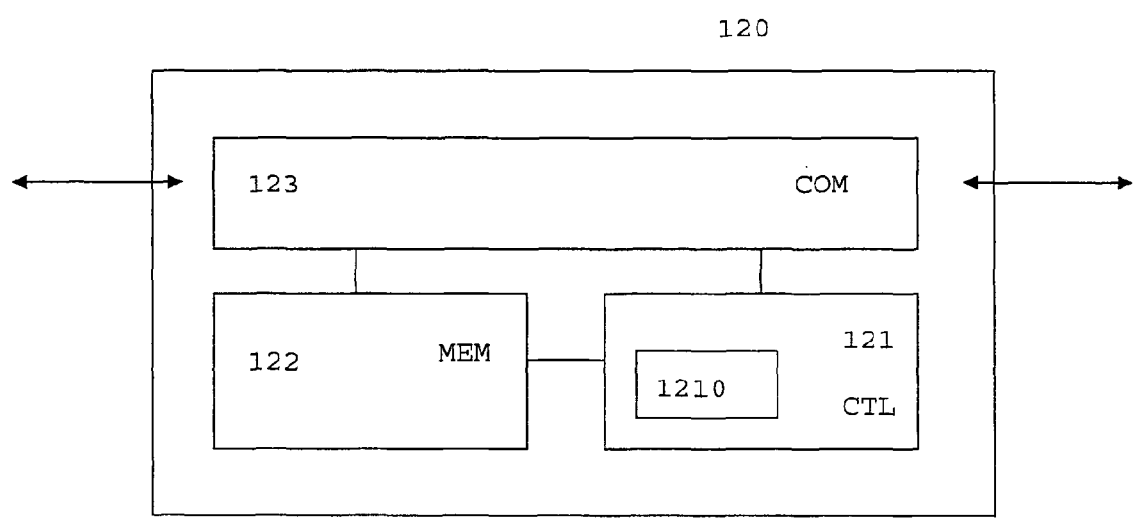
FIG. 12 shows a schematic representation of a first node according to an embodiment of the invention.

FIG. 12 shows a schematic representation of an embodiment of a first node 120 according to the invention. The node 120 comprises a control part 121, which e.g. can be a processor or a group of processors that execute appropriate programs. Numeral 122 refers to a memory part that e.g. comprises buffers for holding packets, volatile memories, non-volatile memories for programs, etc. Numeral 123 refers to a communication part that is adapted to receive and send signals and data packets. Such elements of a node of a communication system are basically known, such that a further description is not necessary here. Thus, node 120 is for handling a data transmission from a sender to a receiver, the data transmission involving node 120 and a further node (e.g. node 13 of FIG. 1) between said sender and receiver, the data packets passing from said further node to node 120 towards said receiver, where node 120 comprises a controller 121 arranged for making a decision on whether to notify the receiver of a congestion condition in said data transmission and sending a control message comprising a congestion indication to the further node. In the example, controller 121 comprises a part 1210 that provides the functionality of making a decision and controlling to send the control message. Part 1210 can e.g. be an appropriate set of code parts of a computer program executed on controller 121. However, it is noted that the described functionalities can be provided as hardware, software or any suitable combination of hardware and software.

Figure 13:
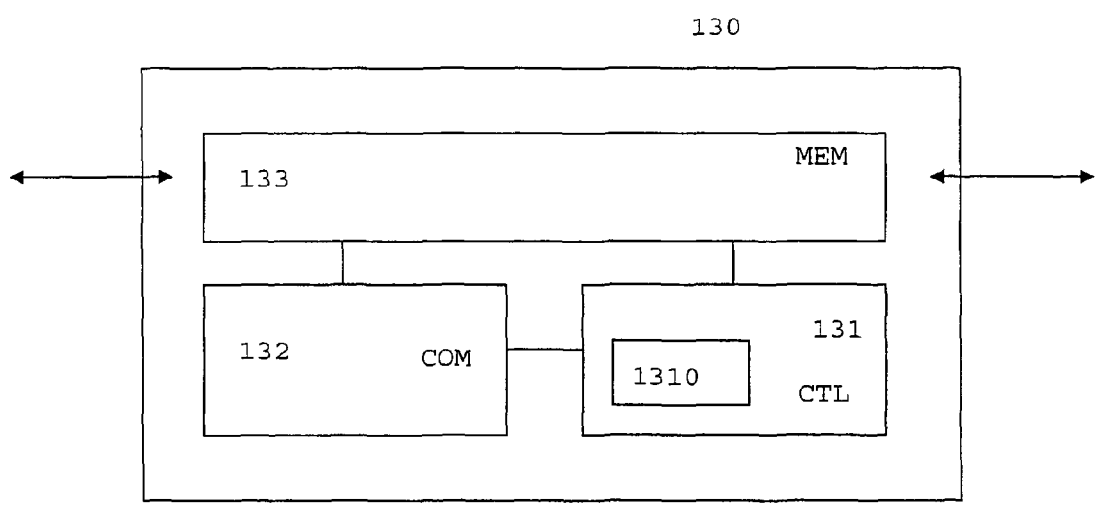
FIG. 13 shows a schematic representation of a second node according to an embodiment of the invention.

FIG. 13 shows a schematic representation of an embodiment of a second node 130 according to the invention. The node 130 comprises a control part 131, which e.g. can be a processor or a group of processors that execute appropriate programs. Numeral 132 refers to a memory part that e.g. comprises buffers for holding packets, volatile memories, non-volatile memories for programs, etc. Numeral 133 refers to a communication part that is adapted to receive and send signals and data packets. Such elements of a node of a communication system are basically known, such that a further description is not necessary here. Thus, node 130 is for handling a data transmission from a sender to a receiver, the data transmission involving said node 130 and a further node (like node 12 in FIG. 1) between said sender and receiver, said data packets passing from node 130 to said further node towards said receiver, where node 130 comprises a controller 131 arranged for receiving a message from said further node relating to a decision on whether to notify said receiver of a congestion condition in said data transmission, and for sending an explicit congestion notification to said receiver if it is decided to notify said receiver of said congestion condition. In the example, controller 131 comprises a part 1310 that provides the functionality of making a decision and controlling to send the explicit congestion notification, based on information received from the further node (node 12), or of controlling to send the explicit congestion notification in response to receiving the congestion indication from the further node. Part 1310 can e.g. be an appropriate set of code parts of a computer program executed on controller 131. However, it is noted that the described functionalities can be provided as hardware, software or any suitable combination of hardware and software.

Now further embodiments of methods for performing congestion notification, of controlling the first and/or second nodes, and further embodiments of the first and/or second nodes will be described. The previously described basic embodiments can thus be appropriately modified.

Preferably the concept of the invention is applied to data transmissions that are protocol stacked data transmissions using data packets of a first layer, and where the first node controls at least a section of the protocol stacked data transmission at a second layer lower than said first layer and is not adapted or unable to access the data packets of said first layer. For example, the section may be a specific link, e.g. a radio between a radio access network node (such as a BSS) and a mobile terminal. The first layer may then be the network layer, e.g. IP packets, and the second layer may be the link layer. The inability to access the data packets, especially to access the header of the data packets, can e.g. be due to encryption of said first layer data packets. As it is assumed that the second node is able to access the data units, this embodiment provides a simple and easy to implement mechanism for letting the first node contribute in an explicit congestion notification scheme, without having to modify the first node or the process of packet transmission for letting the first node access the data packets.

As already mentioned, according to a preferred embodiment, the data packets are Internet Protocol (IP) packets, and the second node is then preferably adapted to perform congestion marking in a header of said Internet Protocol packets.

Figure 3:
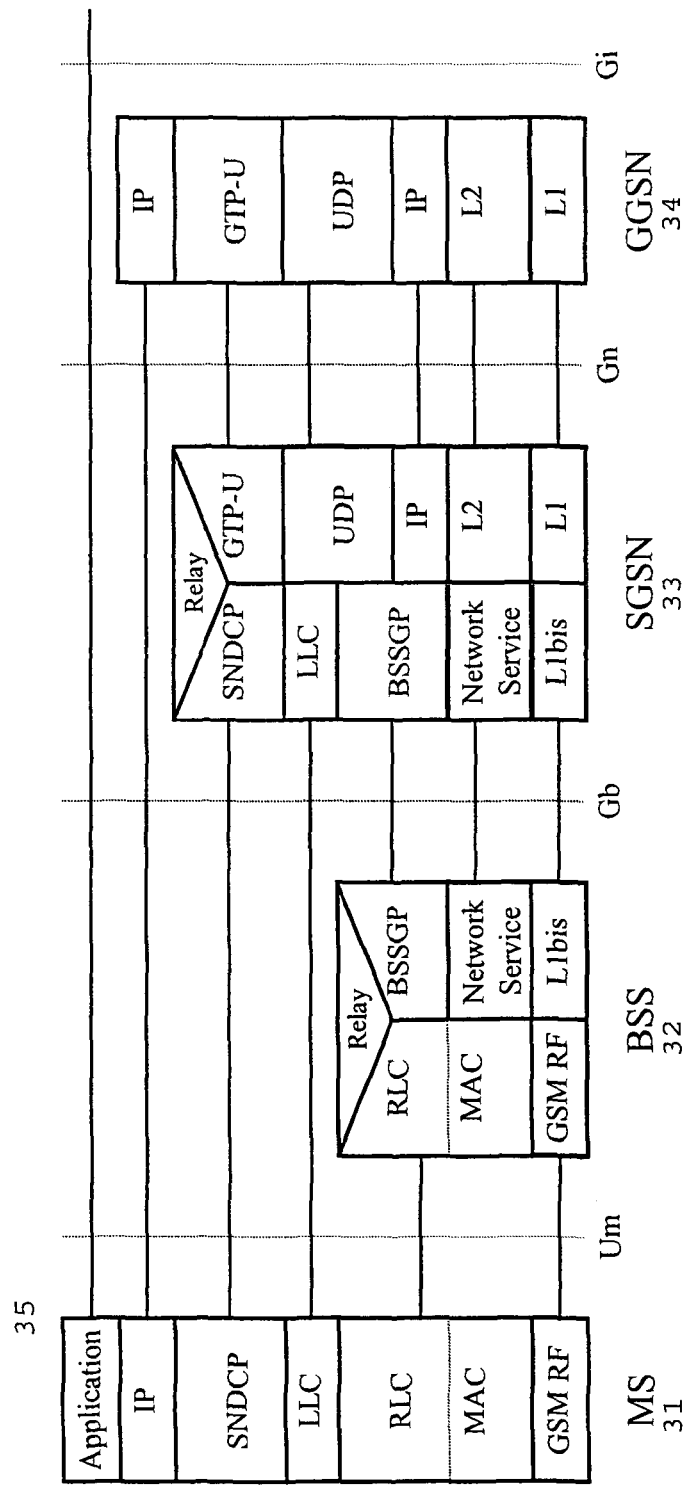
FIG. 3 shows a schematic representation of a communication involving a BSS.
Figure 4:
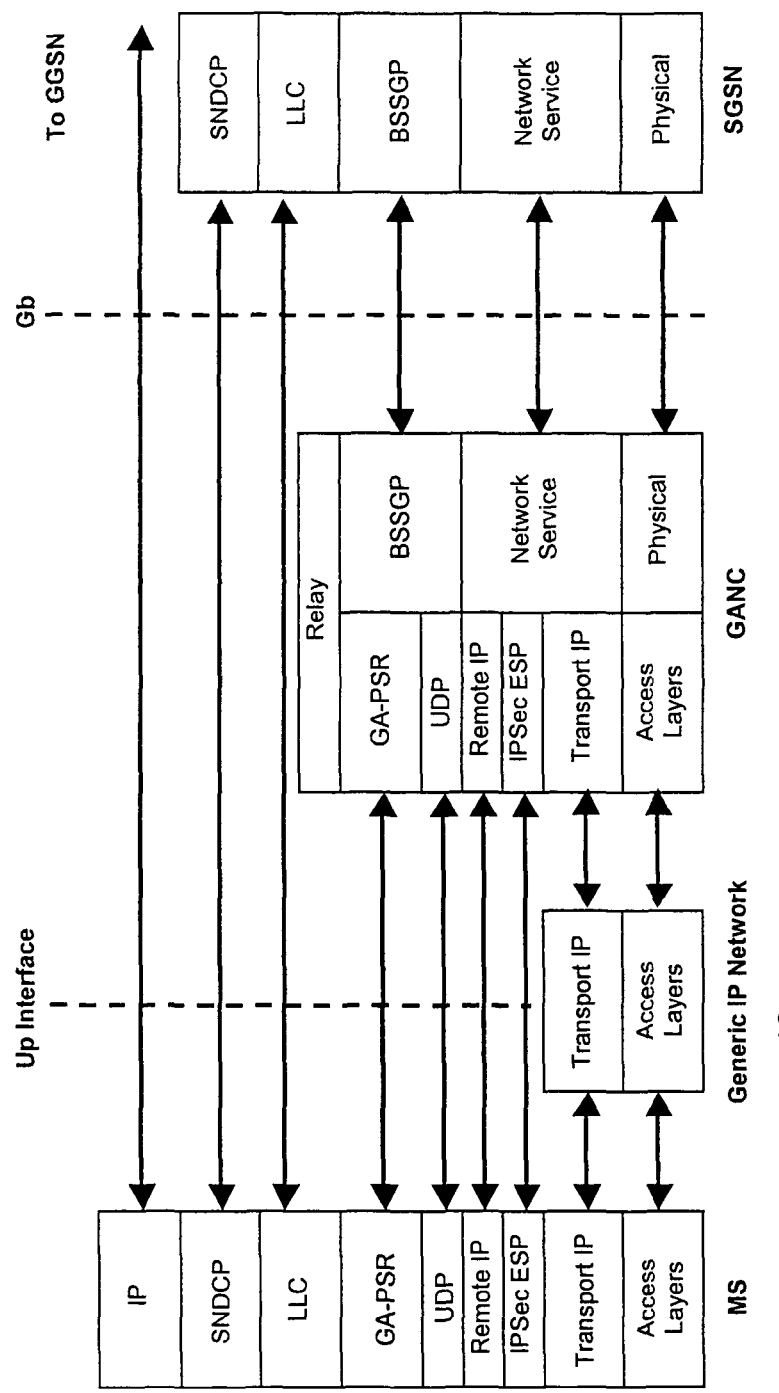
FIG. 4 shows a schematic representation of a communication involving a GANC.

The concepts can in particular be applied to the situations described in connection with FIGS. 3 and 4, i.e. the first node may comprise one of a controller in a Base Station Subsystem (BSS) and a Generic Access Network Controller (GANC). In other words, in accordance with embodiments of the invention BSS 32 and SGSN 33 of FIG. 3 can be arranged to respectively act as first and second nodes as described above, and GANC 43 and SGSN 44 of FIG. 4 can also be arranged to respectively act as first and second nodes as described above.

As already mentioned previously, the message 15 from the first node to the second node can be sent in any suitable or desirable way. Preferably, the message is sent using existing and implemented mechanisms, like Packet Flow Context (PFC) Flow Control or Mobile Station Flow Control.

It is furthermore desirable that the first node identifies one or more flows concerned by congestion and adds to the message information for identifying the one or more flows concerned by congestion. This has the advantage that the second node can then send the explicit congestion notification accordingly, e.g. only mark the packets of affected flows or specifically identify the affected flows in the explicit congestion notification sent to the receiver, such that this information can again be appropriately passed on to the sender for flow control adjustment.

One problem that may occur when sending the explicit congestion notification from the second node to the receiver as a part of the packet stream of the transmission is that buffering delays can occur at the first node for the packets being sent by the second node towards the receiver via the first node and that contain the notification. It is thus preferable in such cases that the explicit congestion notification is sent by said second node in a control message to said first node, e.g. in a Logical Link Control message, that is distinguishable from user plane messages, and that the first node in response to identifying the control message forwarding the explicit congestion notification to the receiver according to a low delay transmission procedure that provides lower delays towards said receiver than experienced by user plane traffic. In other words, the explicit congestion notification packets are then not queued like regular user plane traffic, but are transmitted with priority, in order to reduce the delay as far as possible.

As can be seen, in the context of IP packets, the BSC/GANC, or in general terms a radio access network node, informs the SGSN, or in general terms a core network node, about the need to perform packet marking and then the SGSN may access the IP packet header and perform the packet marking if it is adapted to perform this modification of the IP packets.

It is noted that a method of congestion notification can also be provided by duplicating the ECN field in the link layer protocols, performing marking on a link layer, and copying the link layer marking to the ECN field at the other end of the link.

Correspondingly, the marking of the IP packets can be initiated by the BSC and GANC by using the underlying protocols between the BSC and the MS (i.e. RLC) and between the GANC and the MS (i.e. GA-PSR) to transfer the explicit congestion notification information from the BSC/GANC to the MS and perform there the marking of IP packets according to the notification received via the underlying protocol.

Figure 5:
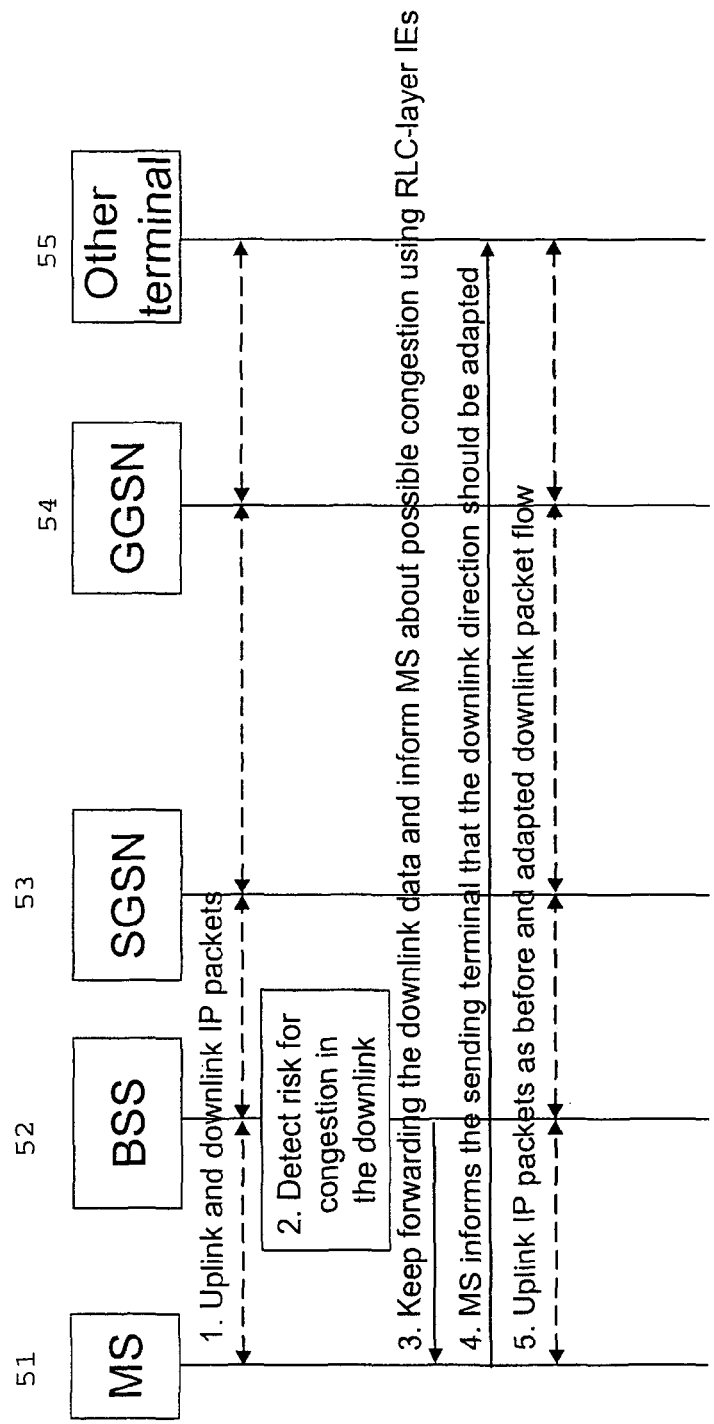
FIG. 5 shows a schematic representation of a communication in which a BSS informs an MS of a potential congestion situation.

Examples of detailed mechanisms are shown in the following FIGS. 5 and 6 using GERAN as an example. FIG. 5 shows an example in which the BSS 52, e.g. a BSC in the BSS, detects possible packet congestion in the downlink direction towards the MS 51. The detection can for example be performed by monitoring radio conditions and/or packet queues. Then the ESS/BSC 52 informs the MS 51 about possible congestion using e.g. RLC-layer mechanisms and the MS 51 can in turn inform a sender 55 of the packets, e.g. a server or another terminal, to adapt the data rate. One option for this procedure is described with respect to FIG. 7 below.

Figure 6:
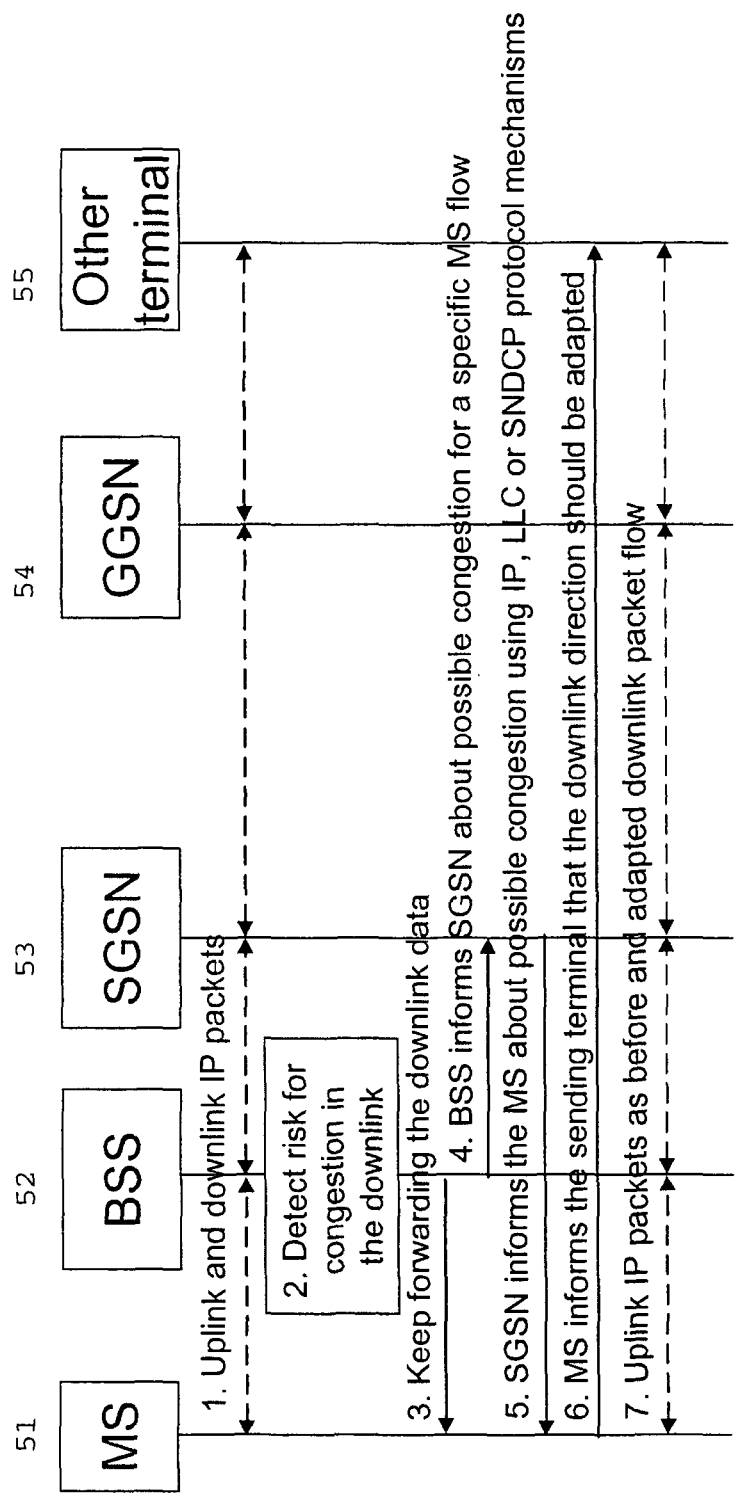
FIG. 6 shows a schematic representation of an embodiment of the present invention in which a BSS informs an SGSN of a potential congestion situation.

FIG. 6 shows another example where the BSS 52 informs the SGSN 53 about possible congestion in the downlink and then the SGSN 53 informs the MS 51 by performing packet marking on the IP packet or by including this indication on LLC or SNDCP protocols.

As shown in FIG. 6, the SGSN 53 can inform the MS 51 about a congestion using IP, LLC or SNDCP layer based on the congestion notification provided by the BSS.

Such congestion notification can be conveyed to SGSN 53 using enhanced existing messages like PFC Flow Control or MS Flow Control, see 3GPP TS 48.018, incorporated by reference. Another alternative is that SGSN 53 evaluates the information about the link rate provided by the BSS in the existing MS Flow Control message (3GPP TS 48.018) and uses it as a base for a decision whether a congestion notification shall be conveyed to the mobile station or not.

The advantage of using PFC Flow Control is the fact that it addresses a packet flow associated with a particular Packet Data Protocol (PDP) Context, i.e. the congestion notification would then be associated with a particular one packet flow and the SGSN could provide this indication to the MS as well on the packet flow or PDP context level, e.g. by only marking IP packets belonging to this specific PFC. MS Flow Control, as currently specified, is a general means to control the downlink (DL) packet rate associated with an MS and thus does not provide the same granularity as the Packet Flow Control mechanism. However, adding information indicating the congested packet flow's PFI (Packet Flow Identifier) enables a similar granularity as provided by the PFC Flow Control mechanism.

Both alternatives that involve sending a message upstream towards the SGSN have larger reaction time compared to the example described in FIG. 5 where it is the BSS that is the node closest to the bottleneck and thus fastest to discover of a potential congestion, that takes the decision to notify the mobile station over the shortest possible path using the RLC layer. A method to avoid the anticipated delay is to convey the congestion notification to the MS using an LLC control message, e.g. a so called exchange IDentification (XID) message. The principles of XID and LLC messages are defined in 3GPP TS 44.064. LLC control messages are marked in BSSGP messages, when sent over the Gb interface between the CN/SGSN and the BSS, in such a way that the BPS can distinguish these messages from the User Plane (UP) messages and thus send these messages over the radio interface with a higher priority, i.e. avoiding queuing and creation of unnecessary extra delay.

Correspondingly, the BSS comprises measurement means for evaluating the state of resources which can potentially be congested, e.g. monitors for determining radio conditions or queue states. The node that takes the decision to notify the mobile station has a processing system to perform the decision, e.g. by comparing the measurement results to corresponding thresholds indicative of an actual or potential congestion. The processing system may also execute further evaluations for determining whether an indication to the MS should be sent, e.g. by averaging results over a period of time. For sending and receiving messages the nodes comprise transmitters and receivers connected to the processing system and/or measurement means.

Figure 7:
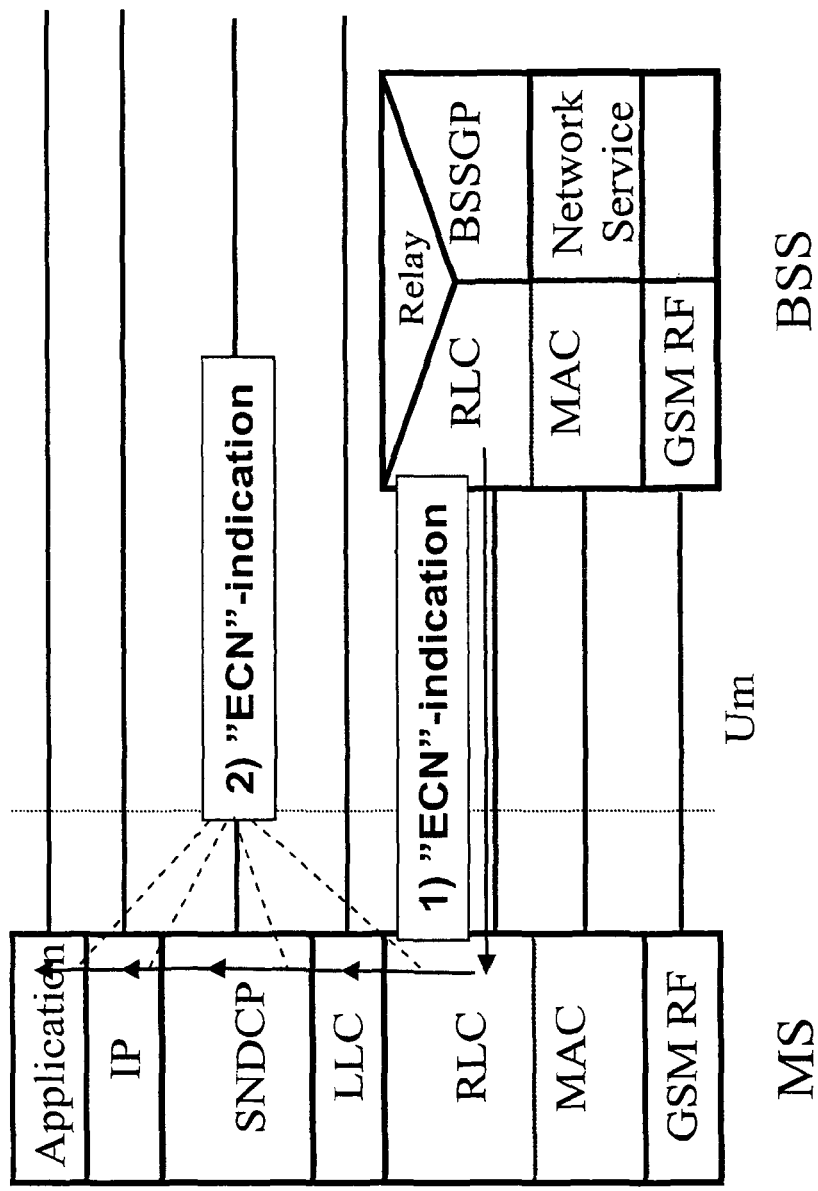
FIG. 7 shows a schematic example of a ECN indication being passed from an RLC control procedure upwards to an application layer control procedure.

There are different alternatives on how the indication about congestion denoted generically as "ECN" is forwarded to the application in the MS. In the GERAN case, the congestion indication "ECN" can be received on any of the lower layers (MAC, RLC, LLC, SNDCP or even IP) and needs to be passed to the receiver application so that it may inform the sending application about the congestion. In the GAN-case, the above mentioned lower layers are somewhat different and are shown in FIG. 4 (e.g. Remote IP, UDP, GA-PSR, LLC, SNDCP or IP). FIG. 7 shows an example of the GERAN case in connection with the example of FIG. 5, when the BSS detects congestion and the ECN-indication is passed from the BSS to the MS using an RLC-layer extension. It is also shown how the RLC-layer informs the LLC-layer about the received ECN-indication which is then passed by the other protocol layers all the way to the application (i.e. the receiver application). In the example where the SGSN sends the explicit congestion notification, the passing of the information upwards is analogous, e.g. a message from the BSS or GANC is received at the BSSGP layer and passed upwards to the LLC layer or SNDCP layer, where IP packets can be accessed and appropriately marked.

The above described concepts provide several advantages. For example, the packet drop rate can be reduced in the GERAN and GAN as a potential congestion can be indicated by the BSC/GANC to the receiving MS already before any congestion takes place. This gives the applications the possibility to adapt the packet transfer rate and bitrate.

In more general terms, a first node may be handling or controlling a lower protocol layer in a data transmission from a sender to a receiver. The first node may control the lower layer only on a section of the data transmission, e.g. on a selected link. A higher layer in the protocol stack of the data transmission may be adapted to forward an indication of a potential congestion to the receiver. The first node may not be adapted to access data packets in the higher layer.

The first node comprises measurement means to monitor quantities indicative of a congestion in the data transmission, for example a potential imminent congestion. The results of the measurements are evaluated to determine whether an indication of the congestion shall be sent to the receiver. If the evaluation is performed in a further node, the measurement results can be forwarded for this purpose. The indication is sent by the node performing the evaluation, i.e. the first or further node, to the receiver of the communication. If the first node sends the indication it can be sent on the lower protocol layer. Alternatively, the further node can send the information on the higher layer or a protocol layer between the lower layer and the higher layer.

The receiver is adapted to inform an application layer of an indication received on the higher layer. If the indication is received on a layer below the higher layer, the receiver is adapted to inform the application layer also of an indication received on a layer below the higher layer. An application in the receiver can then inform the sender to adapt the transmission rate in the data transmission.

The present invention has been described with reference to specific embodiments. It should, however, be noted that these explanations are not to be understood as limiting the invention, as they only serve to better illustrate the inventive concept expressed by the appended claims. Furthermore, reference signs in the claims only serve to make the claims easier to read and have no limiting effect.

The invention claimed is:

1. A method of performing congestion notification for a data transmission from a sender to a receiver, said data transmission involving passing data packets from said sender to said receiver via a first node and a second node between said sender and receiver, said data packets passing from said second node to said first node towards said receiver, the method comprising:
   sending a message from said first node to said second node, said message relating to a decision on whether to notify said receiver of a congestion condition in said data transmission,
   sending an explicit congestion notification from said second node towards said receiver if it is decided to notify said receiver of said congestion condition, wherein said sending comprises sending the explicit congestion notification from said second node in a control message to said first node, said control message being distinguishable from user plane messages, and
   forwarding, from said first node in response to identifying said control message, said explicit congestion notification to said receiver according to a low delay transmission procedure that provides lower delays towards said receiver than experienced by user plane traffic.

2. The method of claim 1, wherein said first node makes said decision and said message comprises a congestion indication.

3. The method of claim 1, wherein said message comprises information for making said decision and said second node makes said decision.

4. The method of claim 1, wherein said data transmission is a protocol stacked data transmission using data packets of a first layer, and said first node controls at least a section of said protocol stacked data transmission at a second layer lower than said first layer and is not adapted to access said data packets of said first layer.

5. The method of claim 4, wherein said first layer is a network layer and said second layer is a link layer.

6. The method of claim 1, where said data packets are Internet Protocol packets, and said second node is adapted to perform congestion marking in a header of said Internet Protocol packets.

7. The method of claim 1, wherein said receiver is a mobile terminal of a mobile communication network, said first node is comprised in an access network and said second node is comprised in a core network.

8. The method of claim 1, wherein said first node comprises one of a controller in a Base Station Subsystem and a Generic Access Network Controller.

9. The method of claim 1, wherein said second node is a Serving General Radio Packet Service Support Node.

10. The method of claim 1, wherein said message is sent using one of Packet Flow Context Flow Control and Mobile Station Flow Control.

11. The method of claim 1, wherein said first node identifies one or more flows concerned by congestion and adds to said message information for identifying said one or more flows concerned by congestion.

12. The method of claim 1, wherein said control message is a Logical Link Control message.

13. A node of a transmission network for handling a data transmission from a sender to a receiver, said data transmission involving passing data packets from said sender to said receiver via said node and a further node between said sender and receiver, said data packets passing from said further node to said node towards said receiver, where said node comprises a controller configured to:
- make a decision on whether to notify said receiver of a congestion condition in said data transmission;
- send a control message comprising a congestion indication to said further node if it is decided to notify said receiver of said congestion condition;
- receiving an explicit congestion notification from said further node in a further control message, said further control message being distinguishable from user plane messages; and
- responsive to identifying said further control message, forwarding said explicit congestion notification to said receiver according to a low delay transmission procedure that provides lower delays towards said receiver than experienced by user plane traffic.

14. A method of controlling a node of a transmission network for handling a data transmission from a sender to a receiver, said data transmission involving passing data packets from said sender to said receiver via said node and a further node between said sender and receiver, said data packets passing from said further node to said node towards said receiver, where said method comprises:
- making a decision on whether to notify said receiver of a congestion condition in said data transmission;
- if it is decided to notify said receiver, sending a control message comprising a congestion indication to said further node;
- receiving an explicit congestion notification from said further node in a further control message, said further control message being distinguishable from user plane messages; and
- responsive to identifying said further control message, forwarding said explicit congestion notification to said receiver according to a low delay transmission procedure that provides lower delays towards said receiver than experienced by user plane traffic.

15. A node of a transmission network for handling a data transmission from a sender to a receiver, said data transmission involving passing data packets from said sender to said receiver via said node and a further node between said sender and receiver, said data packets passing from said node to said further node towards said receiver, where said node comprises a controller configured to:
- receive a message from said further node relating to a decision on whether to notify said receiver of a congestion condition in said data transmission, and
- send an explicit congestion notification towards said receiver if it is decided to notify said receiver of said congestion condition, wherein said sending comprises sending the explicit congestion notification from said node in a control message to said further node, said control message being distinguishable from user plane messages, the further node being configured to forward said explicit congestion notification to said receiver according to a low delay transmission procedure that provides lower delays towards said receiver than experienced by user plane traffic.

16. A method for controlling a node of a transmission network for handling a data transmission from a sender to a receiver, said data transmission involving passing data packets from said sender to said receiver via said node and a further node between said sender and receiver, said data packets passing from said node to said further node towards said receiver, the method comprising:
- receiving a message from said further node relating to a decision on whether to notify said receiver of a congestion condition in said data transmission, and
- sending an explicit congestion notification towards said receiver if it is decided to notify said receiver of said congestion condition, wherein said sending comprises sending the explicit congestion notification from said node in a control message to said further node, said control message being distinguishable from user plane messages, the further node being configured to forward said explicit congestion notification to said receiver according to a low delay transmission procedure that provides lower delays towards said receiver than experienced by user plane traffic.

17. A computer program product stored on a non-transitory computer readable medium and comprising computer code parts configured to, when loaded into and executed on a programmable node of a communication network, control a node of a transmission network for handling a data transmission from a sender to a receiver, said data transmission involving passing data packets from said sender to said receiver via said node and a further node between said sender and receiver, said data packets passing from said further node to said node towards said receiver, by:
- making a decision on whether to notify said receiver of a congestion condition in said data transmission;
- if it is decided to notify said receiver, sending a control message comprising a congestion indication to said further node;
- receiving an explicit congestion notification from said further node in a further control message, said further control message being distinguishable from user plane messages; and
- responsive to identifying said further control message, forwarding said explicit congestion notification to said receiver according to a low delay transmission procedure that provides lower delays towards said receiver than experienced by user plane traffic.

18. A computer program product stored on a non-transitory computer readable medium and comprising computer code parts configured to, when loaded into and executed on a programmable node of a communication network, control a node of a transmission network for handling a data transmission from a sender to a receiver, said data transmission involving passing data packets from said sender to said receiver via said node and a further node between said sender and receiver, said data packets passing from said node to said further node towards said receiver, by:

receiving a message from said further node relating to a decision on whether to notify said receiver of a congestion condition in said data transmission, and sending an explicit congestion notification towards said receiver if it is decided to notify said receiver of said congestion condition, wherein said sending comprises sending the explicit congestion notification from said node in a control message to said further node, said control message being distinguishable from user plane messages, the further node being configured to forward said explicit congestion notification to said receiver according to a low delay transmission procedure that provides lower delays towards said receiver than experienced by user plane traffic.

\* \* \* \* \*

UNITED STATES PATENT AND TRADEMARK OFFICE
CERTIFICATE OF CORRECTION

| | | |
|---|---|---|
| PATENT NO. | : 8,411,561 B2 | Page 1 of 1 |
| APPLICATION NO. | : 12/812475 | |
| DATED | : April 2, 2013 | |
| INVENTOR(S) | : Schliwa-Bertling et al. | |

It is certified that error appears in the above-identified patent and that said Letters Patent is hereby corrected as shown below:

On the Title Page, in item (75), under "Inventors", in Column 1, Line 2, delete "Jari Vikberg," and insert -- Jari Tapio Vikberg, --, therefor.

On the Title Page, in item (75), under "Inventors", in Column 1, Line 3, delete "Hurtgenwald (DE);" and insert -- Hürtgenwald (DE); --, therefor.

In the Specifications

In Column 5, Line 35, delete "12 node" and insert -- node 12 --, therefor.

In Column 5, Line 63, delete "14," and insert -- 11, --, therefor.

In Column 8, Line 30, delete "ESS/BSC" and insert -- BSS/BSC --, therefor.

In Column 9, Line 6, delete "exchange" and insert -- eXchange --, therefor.

In Column 9, Line 10, delete "BPS" and insert -- BSS --, therefor.

In the Claims

In Column 10, Line 64, in Claim 6, delete "where" and insert -- wherein --, therefor.

Signed and Sealed this
Twenty-eighth Day of January, 2014

Michelle K. Lee
*Deputy Director of the United States Patent and Trademark Office*